(12) United States Patent
Elliott et al.

(10) Patent No.: US 7,345,839 B2
(45) Date of Patent: Mar. 18, 2008

(54) SIGNAL PROCESSING IN A DISC DRIVE

(75) Inventors: Carl F. Elliott, Eden Prairie, MN (US);
Ross S. Wilson, Menlo Park, CA (US);
Jeffrey M. Wisted, Burnsville, MN (US)

(73) Assignee: Agere Systems Inc., Allentwon, PA (US)

( * ) Notice: Subject to any disclaimer, the term of this patent is extended or adjusted under 35 U.S.C. 154(b) by 278 days.

(21) Appl. No.: 10/867,239

(22) Filed: Jun. 14, 2004

(65) Prior Publication Data

US 2004/0252395 A1    Dec. 16, 2004

Related U.S. Application Data

(60) Provisional application No. 60/478,770, filed on Jun. 16, 2003.

(51) Int. Cl.
*G11B 5/09* (2006.01)
*G11B 20/10* (2006.01)

(52) U.S. Cl. .................................. 360/51; 360/39
(58) Field of Classification Search ............. None
See application file for complete search history.

(56) References Cited

U.S. PATENT DOCUMENTS

| | | | | |
|---|---|---|---|---|
| 4,577,240 | A * | 3/1986 | Hedberg et al. | 360/22 |
| 5,224,089 | A * | 6/1993 | Matsumura et al. | 360/73.03 |
| 5,425,013 | A * | 6/1995 | Fennema et al. | 369/44.35 |
| 5,822,143 | A * | 10/1998 | Cloke et al. | 360/65 |
| 5,841,387 | A * | 11/1998 | VanBuskirk | 360/32 |
| 5,926,333 | A * | 7/1999 | Bang | 360/51 |
| 6,055,118 | A * | 4/2000 | Du | 360/46 |
| 6,366,081 | B1 * | 4/2002 | Tan et al. | 360/31 |
| 6,587,529 | B1 * | 7/2003 | Staszewski et al. | 375/371 |
| 6,603,722 | B1 * | 8/2003 | Taguchi et al. | 369/59.21 |
| 6,646,822 | B1 * | 11/2003 | Tuttle et al. | 360/46 |
| 6,671,111 | B2 * | 12/2003 | Ottesen et al. | 360/31 |

* cited by examiner

*Primary Examiner*—William Korzuch
*Assistant Examiner*—Daniell L. Negrón
(74) *Attorney, Agent, or Firm*—Steve Mendelsohn; Kevin M. Drucker

(57) ABSTRACT

A disc drive system, such as a magnetic or optical recording and/or playback system, for low-data rate applications implements one or more circuit operations, such as read signal detection and related servo functions, as software-based digital signal processing steps in a dedicated software-based processor. The drive system incorporates increased buffering, modified input sample processing techniques, multiplexing of processing functions, and modified automatic gain control techniques to allow circuit operations to be performed with software-based digital signal processing techniques.

41 Claims, 6 Drawing Sheets

SIGNAL PROCESSING IN A DISC DRIVE

CROSS-REFERENCE TO RELATED APPLICATIONS

This application claims the benefit of the filing date of U.S. provisional application No. 60/478,770, filed on Jun. 16, 2003.

BACKGROUND OF THE INVENTION

1. Field of the Invention

The present invention relates to data transfer through a communication system channel, and, more particularly, to transfer of data information with respect to a recording medium.

2. Description of the Related Art

Increasingly, consumer electronics applications require low-cost implementations for data storage, including associated read/write signal processing and servo-control electronics for a disc drive. Many applications require relatively modest data rates such as the 65 Kb/s data rate characteristic of MPEG audio. JPEG picture storage in digital cameras and low-rate MPEG video data storage are also low data rate applications. Cellular handsets, with their extreme cost sensitivity and emerging picture-handling and messaging capabilities, are another application. Speed requirements are modest, and host processors already incorporate hardware-assists for error correction and signal detection.

In magnetic and optical recording/playback disc drive systems, designers of the prior art have focused on high data-throughput and low access time as design goals while striving for a moderate cost. However, high data-throughput and low access time tend to require comparatively costly hardwired solutions. Hardwired solutions may include dedicated circuit designs to implement different functions of the disc drive system.

As integrated circuit (IC) semiconductor processes continue to allow for increased IC circuit density and higher processor operating (clock) speed, many circuit operations previously implemented with dedicated circuits might now be implemented with digital processing techniques. Signal processing as steps of a software program trades processor memory capacity and time-multiplexing complexity of processing activities for a reduction in the number of dedicated circuits. Software-based signal processing also allows flexibility when reconfiguring a system's operation to new design requirements or to remedy design flaws discovered during mass production without discarding existing system circuitry.

Therefore, it is desirable to provide a disc drive system for low data rate applications that implements many circuit operations, such as read signal detection and related servo functions, as digital signal processing steps in a dedicated processor

SUMMARY OF THE INVENTION

The present invention relates to a disc drive system, such as a magnetic or optical recording and/or playback system, for low-data rate applications that implements one or more circuit operations, such as read signal detection and related servo functions, as software-based digital signal processing steps in a dedicated software-based processor. The drive system incorporates increased buffering, modified input sample processing techniques, multiplexing of processing functions, and modified automatic gain control techniques to allow circuit operations to be performed with software-based digital signal processing techniques.

In accordance with one embodiment of the present invention, the disc drive system includes a head assembly, a sampling section, a memory, an orientation timer, and a software-based processor. The head assembly transfers a read signal from a recording medium based on a control signal. The sampling section samples the read signal from the recording medium based on a local clock signal and a gain signal. The memory stores the sampled signal based on the local clock signal and timing information to i) select a rate of the local clock signal and enable transfer of the sampled signal into and out of the memory. The orientation timer generates the timing information based on a loop timing signal. The software-based processor generates the control signal so as to process the sampled signal from the memory with one or more routines. The software processor implements at least a portion of the processing for one or more of the following routines: 1) a data processing routine that processes the sampled signal, 2) a phase-locked loop routine (PLL) that generates the loop timing signal, and 3) an automatic gain control (AGC) routine that i) calculates a gain gradient from the sampled signal processed by the data processing routine and ii) generates the gain signal based on a gain gradient.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
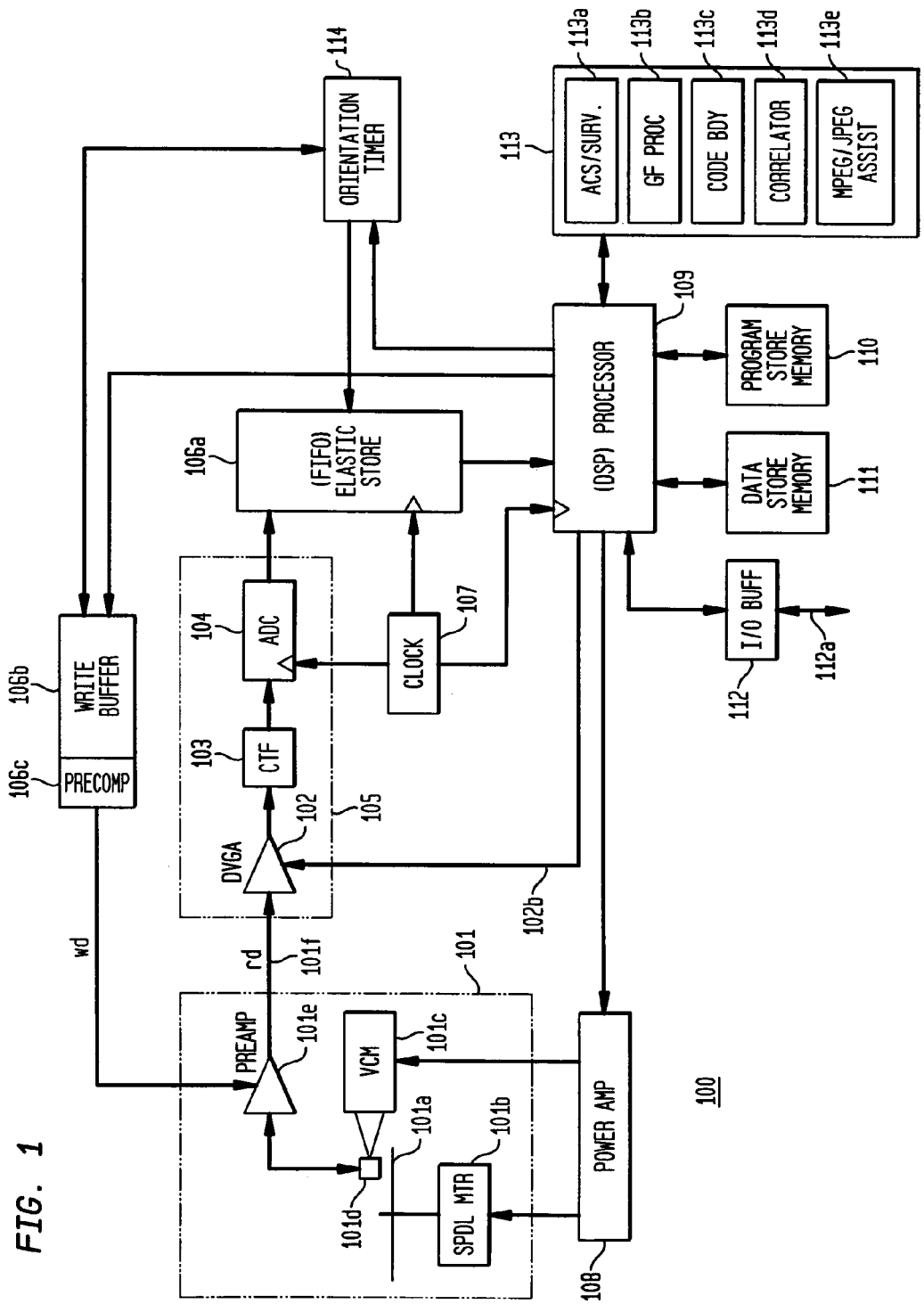
FIG. 1 shows a disc drive operating in accordance with an exemplary embodiment of the present invention.

FIG. 1 shows disc drive 100 operating in accordance with an exemplary embodiment of the present invention. Disc drive 100 comprises head-disc assembly 101; sampling section 105 having digitally-controlled variable-gain amplifier (DVGA) 102, continuous time filter (CTF) 103 and analog-to-digital converter (ADC) 104; memory 106 comprising elastic store 106a and write buffer 106b; system clock 107; power amplifier (PA) 108; processor 109; program store memory 110; data store memory 111; optional I/O buffer 112; accelerator 113; and orientation timer 114.

Head-disc assembly 101 might be a hermetically sealed enclosure including recording medium 101a rotated by spindle motor (spdl mtr) 101b. Read/write head 101d might be radially actuated by voice-coil motor (VCM) 101c, allowing head 101d to be positioned via control signals over data tracks on recording medium 101a. Preamplifier 101e comprises write-channel drivers and read-channel preamplifiers associated with head 101d to adjust i) signals being written on or ii) signals being read from, respectively, recording medium 101a. Head 101d, for the described embodiment, may be of magneto-resistive construction for a magnetic recording/playback system. While the preferred embodiment is described herein with respect to a magnetic recording/playback system one skilled in the art may extend the teachings to other types of systems, such as optical recording systems.

During a read cycle, information recorded on disc 101a is read by head 101d as an output signal (a "read signal") to preamplifier 101e, which delivers an amplified analog read signal to DVGA 102. DVGA 102 may be implemented as a conventional variable-gain amplifier using Gilbert-cell topology, with gain controlled by an input signal from a digital-to-analog converter (not shown in FIG. 1), or alternatively, with direct digital gain control by means of a switched resistive attenuator. Gain control of DVGA 102 is enabled by gain-control signals generated by processor 109 in a manner described subsequently. DVGA 102 maintains signal level to CTF 103 and ADC 104 at a standard amplitude, despite changes in signal level from preamplifier 101e.

The output signal of DVGA 102 is low-pass, anti-alias filtered by CTF 103 and sampled by ADC 104 to generate a sample sequence. ADC 104 might be implemented using either a flash ADC or successive-approximation ADC, depending on the data-rate of the analog read signal. A successive-approximation ADC might be preferred in low rate systems, since they generally consume less silicon area than a flash ADC, and a successive-approximation ADC might require the addition of a track-hold function to reduce aperture uncertainty to acceptable level. ADC 104, as well as other elements of FIG. 1, operates at a relatively constant rate based on a system clock signal from clock 107. Clock 107, in addition to circuitry providing the system clock signal, might include one or more phase-locked loop circuits (PLLs) to derive one or more additional clock signals having differing rates (frequencies) from a common crystal oscillator.

ADC 104 provides output samples (representing the digitally sampled read signal) that are buffered in elastic store buffer 106a. ADC 104 might employ a sampling frequency somewhat above the Nyquist rate to support digital timing restoration with interpolation. Significantly higher sample rates may be chosen in order to relieve requirements on the order and complexity of anti-alias CTF filter 103 by performing noise filtering digitally in processor 109 prior to down-sampling to the symbol rate. The read signal comprises a sequence of read symbols representing encoded servo information (servo burst data) and encoded user information (user data record).

Processor 109, which, for one embodiment is a digital signal processor (DSP), receives the samples from elastic store 106a. Elastic store buffer 106a might include independent read-in/read-out pointer counters (not shown in FIG. 1) to allow for separate storage of i) digitized servo burst data and ii) user data samples. Consequently, elastic store buffer 106a is timed so as to receive digitized servo burst data and user data via signals generated by orientation timer 114. The internal counters of elastic store buffer 106a are preferably dynamically controlled by signals from orientation timer 114 that are generated in accordance with low-bandwidth digital PLL algorithms of processor 109 to track user data record and servo burst data locations on recording medium 101a.

Orientation timer 114 receives instructions from processor 109 and also provides timing signals for control of read cycle/write cycle operations when data is read/written to recording medium 101a. Cooperation of orientation timer 114 with elastic store 106a is described subsequently with respect to FIGS. 5 and 6.

Processor 109 employs programs stored in program memory 110, and processor 109 accesses processed data to/from data store memory 111. Processor 109 applies signal processing algorithms to samples stored in elastic store buffer 106a, to yield a decoded output data stream. Optional input/output (I/O) buffer 112 might be employed to moderate dataflow between processor 109 and the software application. Memories 110 and 111 may be implemented as dynamic or static memory or a combination of dynamic and static memory, included on an integrated circuit (IC) chip with processor 109 to reduce access time. Program memory 110 might be implemented in Flash or non-volatile ROM technology. Processor 109 preferably embodies a Harvard architecture having separate and concurrently accessed data and program store memories to achieve greater parallel processing and increased execution speed.

Processor 109 also employs programs to generate i) control signals coordinating read cycle/write cycle operations by head-disc assembly 101, ii) control signals for various timing loops, and iii) signals that adjust various amplifier gains for automatic gain control (AGC) loops.

To achieve greater processing efficiency for algorithms having repetitive operations, measured in terms of shortened execution time or reduced program steps/iterations, processor 109 might also include, either internally or separately as shown in FIG. 1, accelerator 113. Accelerator 113 includes function accelerators 113a through 113e, and each function accelerator might typically be dedicated hardware to perform a repetitive function, such as an add-compare-select (ACS) function commonly employed by a Viterbi algorithm of a Viterbi detector (such function accelerator might include storage for survivor-path management). ACS 113a of FIG. 1 performs the described ACS/Survivor path management function. Accelerator 113 also contains Galois field (GF) processor 113b, which might include a syndrome calculator, to support error correcting code (ECC) functions. Code lookup table/boundary calculator 113c might be employed for bitwise encode/decode (endec) functions associated with the disc modulation code used to modulate data recorded on medium 101a. Digital correlator 113d might be employed to detect synchronization marks prefacing servo burst data and user data records. MPEG/JPEG assist elements 113e might be employed to support audio/still picture encoding/decoding.

The extent of accelerator functions incorporated in accelerator 113 exhibits a tradeoff between hardware-enabled functions and software-enabled functions in processor 109 of disc-drive 100. One factor influencing such tradeoff is that function accelerators in accelerator 113 are concentrated on bit-level boolean operations, for which operations a DSP implementation of processor 109 is typically inefficient. Another factor influencing such tradeoff is the extent to which such function is currently supported by existing signal processing algorithms. For example, finite impulse response filtering associated with equalization and digital timing recovery are generally supported in prior art DSPs by the multiply-accumulate instruction, and so might be more efficiently implemented in the DSP rather than in an external function accelerator. Viterbi detection ACS (Add-Compare-Select) and ECC hardware-assist circuits are also increasingly available in low-cost processors serving the mobile communications market.

During a write cycle, write buffer 106b receives, from processor 109, data to be written to medium 101a. Write buffer 106b might be of a memory size sufficient to contain a single data record. Orientation timer 114 generates signals so as to cause write buffer 106b to write serial data on the disc at the appropriate record location. Write buffer 106b may be coupled through a parallel-to-serial convertor (serializer) to optional write pre-compensation logic (precomp) 106c, which produces a write data signal wd to toggle write current in head 101d. Precomp 106c may adjust the data from write buffer 106b to cancel or reduce effects (dispersion or other distortion) of writing data to medium 101a by head 101d.

Power amplifier 108 receives digital information from processor 109 over a bus or serial link. This digital information is converted into, for example, an analog signal format or a digital pulse-width-modulation format, and this formatted information is provided to spindle motor 101b and VCM 101c. Control algorithms implemented by processor 109 regulate spindle speed and establish position of VCM 101c to maintain the position of head 101d over the desired track. Servo information pre-recorded at the factory on medium 101a is read by head 101d, which servo information provides feedback data to processor 109 to close speed and position control loops implemented under direction of processor 109.

Processor 109 may store the entirety of its control program in a portion of program store memory 109, in which case a portion of memory 109 would be implemented in ROM or flash technology. Alternatively, to minimize the size of flash memory, processor 109 may employs a bootstrap routine to obtain adequate initial control over disc drive 100 as disc drive 100 transitions to steady state operation. The code for this bootstrap routine might be stored in a partition of program memory 110. Alternatively, a first portion of the code for this bootstrap routine might be downloaded from medium 101a using a (simplified) second portion of the code stored in program memory 110. Since full signal detection might require the presence of associated signal processing microcode in memory, a simplified hardware channel using peak detection or zero-crossing of a simply-encoded low-density high-resolution playback signal may be provided for the bootstrap routine.

Figure 2:
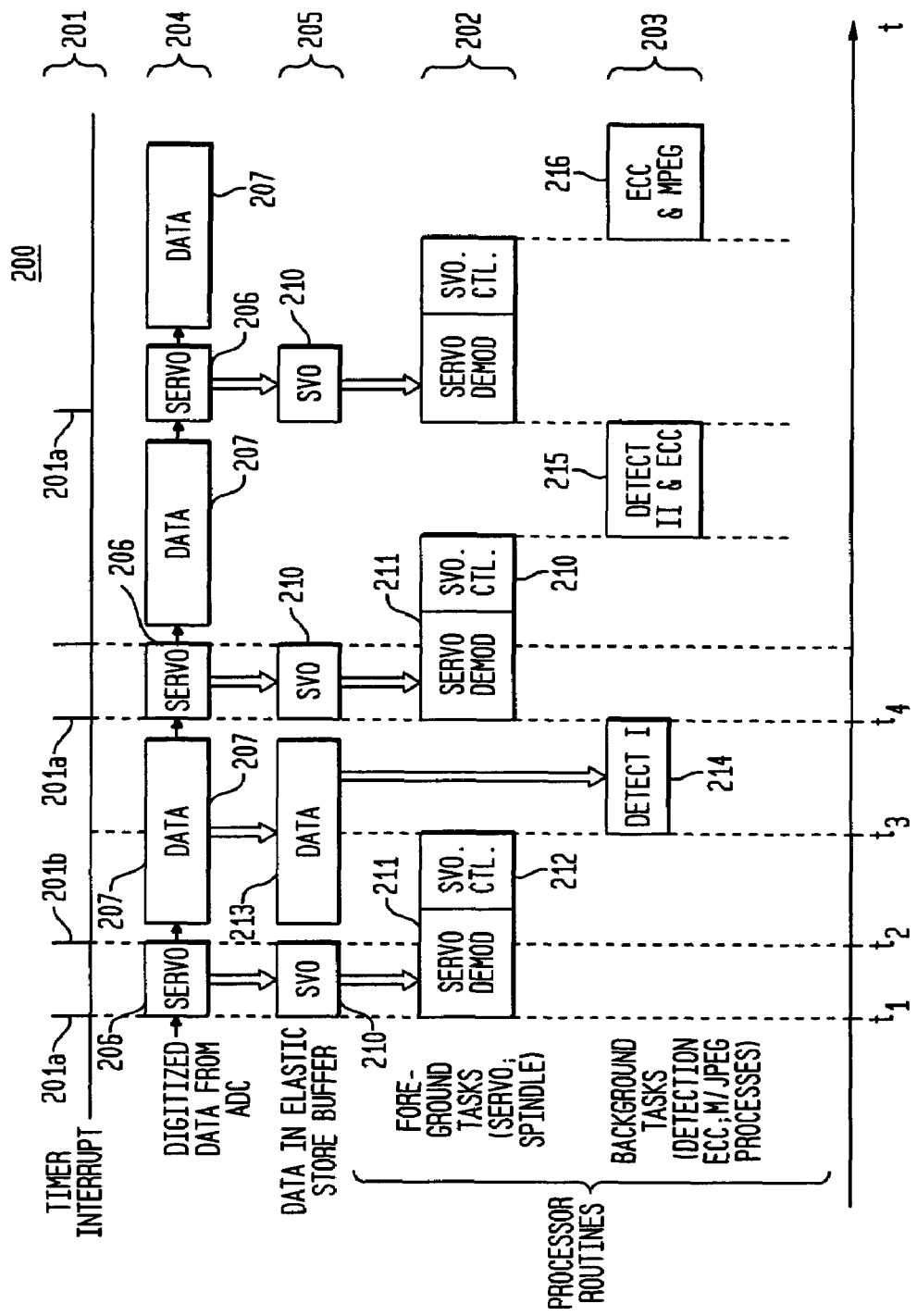
FIG. 2 shows exemplary scheduling of signal processing within the processor of FIG. 1.

FIG. 2 shows an exemplary scheduling time line 200 of signal processing by routines 202 and 203 within processor 109 of FIG. 1. Time line 200 illustrates, in rectilinear format, the sequence of events for processing of data along a disc track by disc drive 100 during a read cycle operation. Although FIG. 2 shows that the format of the user-interface read/write data of medium 101a is MPEG or JPEG data, one skilled in the art might extend the teachings herein to other user-interface data formats, such as raw data, or error-corrected data, subject to further processing by elements not shown in the FIGs.

Referring to FIG. 2, digital sample values (e.g., digitized data) 204 from ADC 104 includes servo burst data 206 interspersed with data records 207. Digital sample values 204 from ADC 104 are applied to elastic store buffer 106a and stored as servo data 210 and user data 213. In response to timer interrupts 201a and 201b generated in orientation timer 114, processor 109 is alerted to the presence of servo burst data (corresponding to interrupts 201a) or user data record (corresponding to interrupts 201b) on the disc. Processor 109 retrieves the corresponding raw servo data 210 or user data 213 from buffer 106a.

For example, as shown in FIG. 2, at time $t_1$, servo interrupt 201a is generated indicating arrival of servo burst data. Processor 109, in response to interrupt 201a at $t_1$, begins servo demodulation routine 211 using servo data 210 from elastic store buffer 106a. Servo demodulation routine 211 processes servo data 210 into servo information employed by servo control routine 212. Servo control routine 212 then generates servo control information that processor 109 supplies to spindle motor 101b and VCM 101c (via power amplifier 108) for servo control feedback loops. Meanwhile, at time $t_2$, interrupt 201b is generated, indicating the presence of data 207. Processor 109 completes processing by servo control routine 212 at time $t_3$, at which time processor 109 initiates data detection processing by first detection routine 214.

Processor 109 may provide digital signal processing by routines having differing priorities. For the exemplary scheduling of FIG. 2, the routines are divided into high-priority routines 202 indicated by interrupt 201a and low-priority routines 203 indicated by interrupt 201b. For example, processing of servo data 210 by servo demodulation routine 211 and servo control routine 212 has a relatively high priority, while processing of user data 213 has a relatively low priority. Servo data processing is desirably assigned relatively high priority to i) reduce transport delay and ii) provide relatively fast/accurate servo control response. Servo data processing algorithms may exploit well-known state-estimator techniques known to those skilled in the art, and effects of transport delay may be partially mitigated by adding one or more delay states in the state estimator. Low priority routines are shown in FIG. 2 as data detection 214, error check/correct (ECC) 215, and MPEG decode 216 routines that are initiated by interrupt 101b.

FIG. 2 illustrates low-priority routines as executed as distinct functions. However, some embodiments of the present invention might employ time-sharing, overlap, or other interaction between the processing routines. In addition, interrupts 101a and 101b might be generated upon detection of servo burst data 206 and user data record 207, respectively, or may be generated independently by orientation timer 114. When interrupts are independently generated, orientation timer 114 might synchronize to the beginning of servo burst data occurrences using a PLL.

For write cycle operations, processor 109 employs a similar sequence to that shown in FIG. 2 for a read cycle operation. Processor 109 employs an MPEG encoding routine, an ECC generation routine, and a data modulation coding routine to generate write data. Processor 109 then causes transfer of the write data to buffer 106b. Processor 109 invokes servo data processing routines similar to that described for the read cycle operation to generate head positioning information for spindle motor 101b and VCM 101c (via power amplifier 108) to position head 101d over medium 101a.

The raw off-disc data rate (i.e., the rate that data record bits are received from medium 101a) is generally higher than the data rate of a user application. For example, for video applications, the raw off-disc data bit rate is considerably higher than the raw MPEG bit rate, and the raw off-disc data bit rate might be too high to allow for continuous user application processing by processor 109. Therefore, and possibly to eliminate need for a large and costly Elastic Store buffer 106a, user data records are written in an interleaved fashion along the disc. Consequently, for every user data record read and processed as shown in FIG. 2, a number of other user data records are skipped, and this interleaving might also include skipping of disc revolutions. For the exemplary video application, since low-priority routines such as the ECC and MPEG decoding routines shown in FIG. 2 might deliver data only at the desired MPEG (or JPEG) decoder output rate, interleaving with record and disc revolution skipping might be employed. Elastic store buffer 106a and programs of processor 109 might accordingly scale data rates from the instantaneous off-disc rate (e.g., 50 Mb/s) to the decoder output rate (e.g., 65 Kb/s MPEG audio decoder input bit rate).

Figure 3:
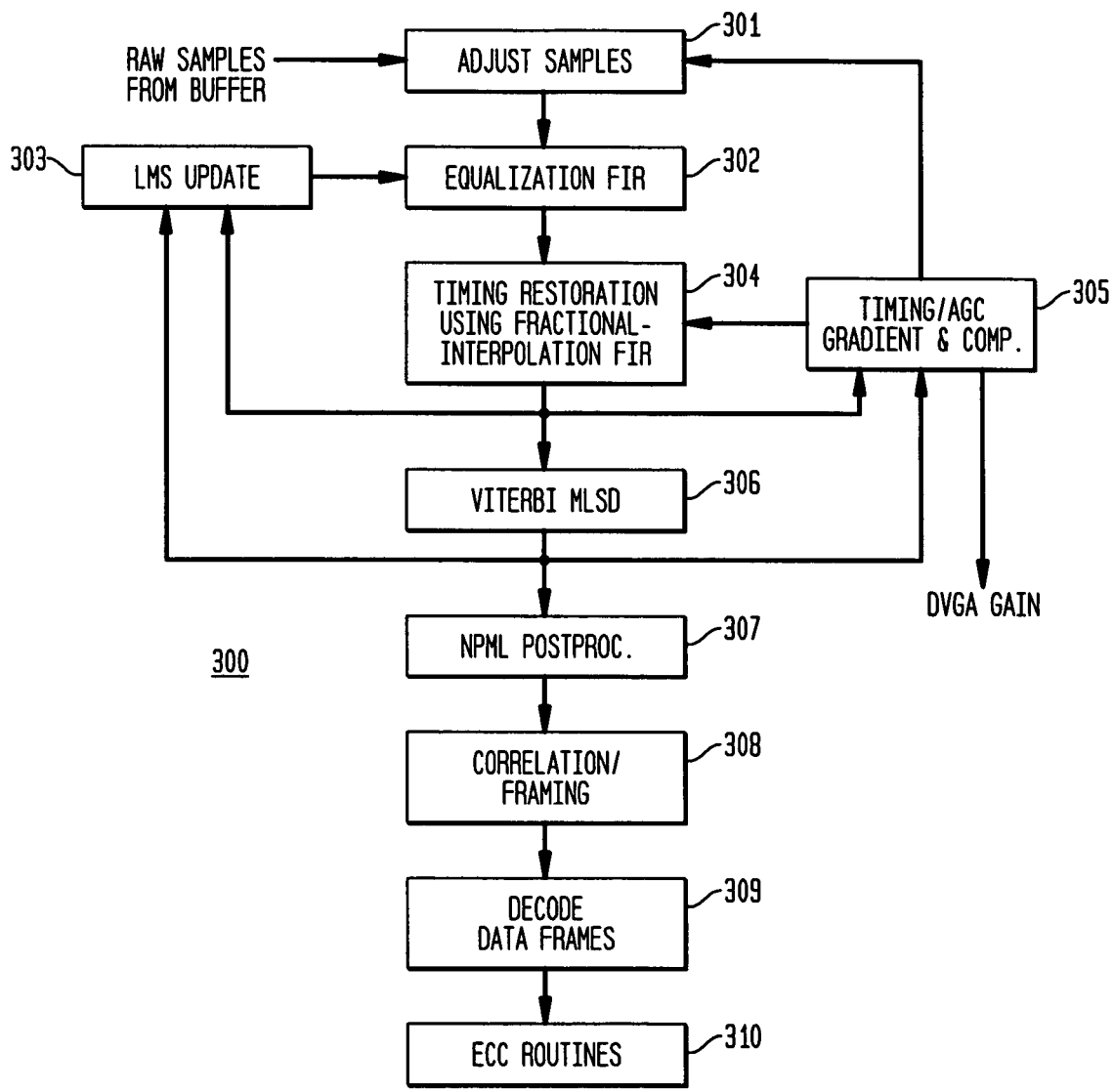
FIG. 3 shows an exemplary method of processing by the data detection routine of FIG. 2.

FIG. 3 shows an exemplary method of processing by data detection routine 214 of FIG. 2. Data from ADC 104 is stored in elastic store buffer 106a and is applied to step 301. At step 301, gain compensation is applied to the raw input samples to adjust the samples in accordance with a fine AGC loop as described subsequently. At step 302, equalization is applied to the sampled signal with a digital signal processing realization of a finite impulse response (FIR) equalizer. Tap-weights for the FIR equalizer might be updated via least mean squares (LMS) update at step 303. LMS update at step 303 might employ i) an update algorithm based on minimization of a squared difference cost function and ii) one or more of the output values of steps 304 and 306. Tap-weights are updated based on the LMS error between the observed symbol sample value and the corresponding reference symbol sample value. Tap-weight update at step 303 might occur infrequently throughout the data record to reduce the number of processing cycles used, if desired.

At step 304, timing restoration applies interpolation to the equalized, sampled signal using an interpolation FIR. Tap-weights for interpolated timing restoration might be stored in a look-up table in memory. At step 305, the tap-weights for the interpolation FIR of step 304 are supplied and updated by a timing/AGC gradient and compensation routine. Also, at step 305, gain adjustment values are calculated for fine and coarse AGC loops, as described subsequently with respect to FIG. 4. Step 305 generates a gain adjustment value for the coarse AGC loop to control gain of DVGA 102 so as to maintain the input signal of ADC 104 within the dynamic range of ADC 104. Equalization and interpolation FIR filtering for steps 302 and 304 are efficiently implemented with one instruction per equalization or interpolation FIR tap by use of the multiply-accumulate processor instruction.

At step 306, a Viterbi maximum likelihood sequence detection (MLSD) algorithm is applied to the processed data samples to detect the user data bits. Optional NPML (Noise Predictive Partial Response) post-processing block 207 might be employed to adjust the values of the user data bits to account for non-optimality of maximum-likelihood detection in colored noise. As described previously, an accelerator function (e.g., ACS/Surv 113a of FIG. 1) might be employed by the Viterbi MLSD algorithm for computational efficiency. At step 308, correlation and framing of the detected user data bits are performed to generate data frames by detecting sync marks.

Other detection methods, such as iterative decoding, may also be applied in FIG. 3 to replace MLSD and gain error-rate advantage.

At step 309, the data frames are decoded. Step 309 decodes the data frames to generate uncorrected information codewords (each codeword representing ECC-encoded user information bits) and erasure pointers indicative of detected illegal codewords targeted for error correction. At step 310, an ECC routine applies error correction and decoding of the codewords to provide user information. Step 310 might be implemented via table-look-up Alternatively, the ECC routine might employ a function accelerator such as GF processor 113b of FIG. 1) as an assist in processing Reed-Solomon (RS) ECC codes. Syndrome computation might also be employed using a function accelerator and with nonzero syndromes indicative of an error invoking further error-correction software routines by processor 109. Alternatively, all ECC functions might be performed external to disc drive 100 through I/O buffer 112, in which case the GF processor is not used and no ECC routines are invoked by processor 109. External execution of ECC functions is desired when the computational power of processor 109 is limited or where the external error-correction and/or concealment capability is already present (e.g., in other programs external to the disc drive).

AGC may be implemented in either single- or dual-loop configurations. In a dual-loop configuration, a coarse AGC loop (also termed an outer or ranging loop) regulates the read signal level at the input of ADC 104 by adjusting the gain of DVGA 102 to avoid driving ADC 104 into saturation. ADC 104 is in this case provided with one or more bits of resolution in excess of that required to digitally sample the output of CTF 103 to a desired resolution. For a nested dual-loop AGC configuration, resolution of the control signal for DVGA 102 may be kept low (e.g., six- to eight-bit resolution). Those skilled in the art will recognize that the presence of transport lag in buffer 106a might destabilize the coarse AGC loop. Consequently, the loop bandwidth of the coarse AGC loop is relatively low. A fine AGC loop performs relatively precise gain trimming by adjusting sample values in elastic store buffer 106a. Thus, the fine AGC loop provides amplitude regulation of samples for subsequent equalization and Viterbi MLSD (symbol detection). The coarse and fine AGC loops might typically operate at different sample update rates, with the fine ADC loop updating at the symbol rate and coarse AGC loop updating at the data record-recurrence rate. Alternatively, the coarse AGC loop might be implemented with table-driven gain adjustment.

Figure 4:
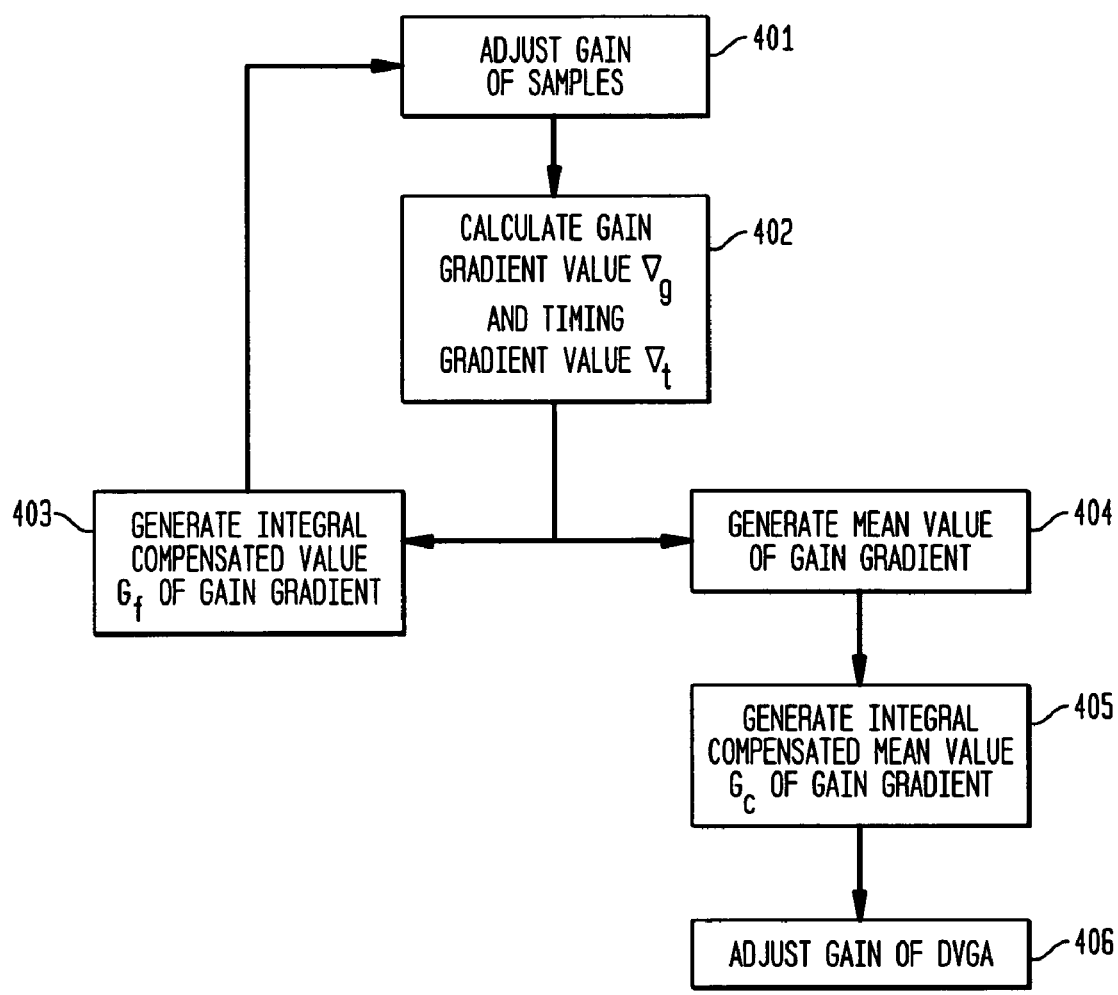
FIG. 4 illustrates an exemplary method of dual-loop automatic gain control implemented by the processor of FIG. 1.

FIG. 4 illustrates an exemplary method of dual-loop AGC for step 304 of FIG. 3 that might be implemented by processor 109. At step 401, samples from elastic store buffer 106a are multiplied with a gain value, providing sample gain adjustment by the fine AGC loop and generating a gain-regulated sample sequence, which is processed by steps 301 through 306 of FIG. 3 for equalization of the sampled signal and MLSD. The detected sample sequence of step 306 is then employed at step 402 to generate gain and timing gradient values $\nabla_g$ and $\nabla_t$, respectively. The timing gradient $\nabla_t$ is a measure of the error between the actual and estimated sample symbol timing, and is employed to update interpolation FIR tap-weights for symbol timing recovery. The gain gradient $\nabla_g$ is a measure of the error between the actual and estimated ideal signal gain. The gain gradient $\nabla_g$ is employed by both the coarse and fine AGC loops.

At step 403, for the fine AGC loop, an integrated compensation is employed to update the value employed to adjust the gain of samples at step 401 (closing the relatively fast, fine AGC loop). The integrated compensation is given in equation (1):

$$G_f = k_f \frac{z^{-1}}{1-z^{-1}} \nabla_g \quad (1)$$

The value $k_f$ is a constant selected to adjust gain compensation performance of the fine AGC loop. To render the fine AGC loop transfer function independent of signal amplitude, an exponentiation operation (not shown in FIG. 4) may be performed. The fine AGC loop is generally free from relatively large delays, with the principal added delay being latencies inherent in equalization and MLSD processing.

At step 404, for the coarse AGC loop, the mean value of the gain gradient signal is computed over the last processed data record. At step 405, integral compensation of the mean value is applied to generate a gain control signal $G_c$ for DVGA 102. The integrated compensation is given in equation (2):

$$G_c = k_c \frac{z^{-1}}{1-z^{-1}} \mathrm{mean}(\nabla_g) \qquad (2)$$

The value of $k_c$ is a constant value selected to adjust gain compensation performance of the coarse AGC loop.

At step 406, the gain of DVGA 102 is adjusted (closing the relatively slow, coarse AGC loop). Further processing steps, not shown in FIG. 4, might include, but are not limited to, i) summing of table-driven feed-forward gain control between steps 305 and 306 and ii) employing Smith-Predictor methods for the coarse AGC loop to mitigate the effect of transport lag. To minimize settling transients at the switching of head 101d, loop integral compensation of steps 403 and 405 might be initialized at the point of head switching, with initial values of $G_f$ and $G_c$ selected based on the particular type of head.

Figure 5:
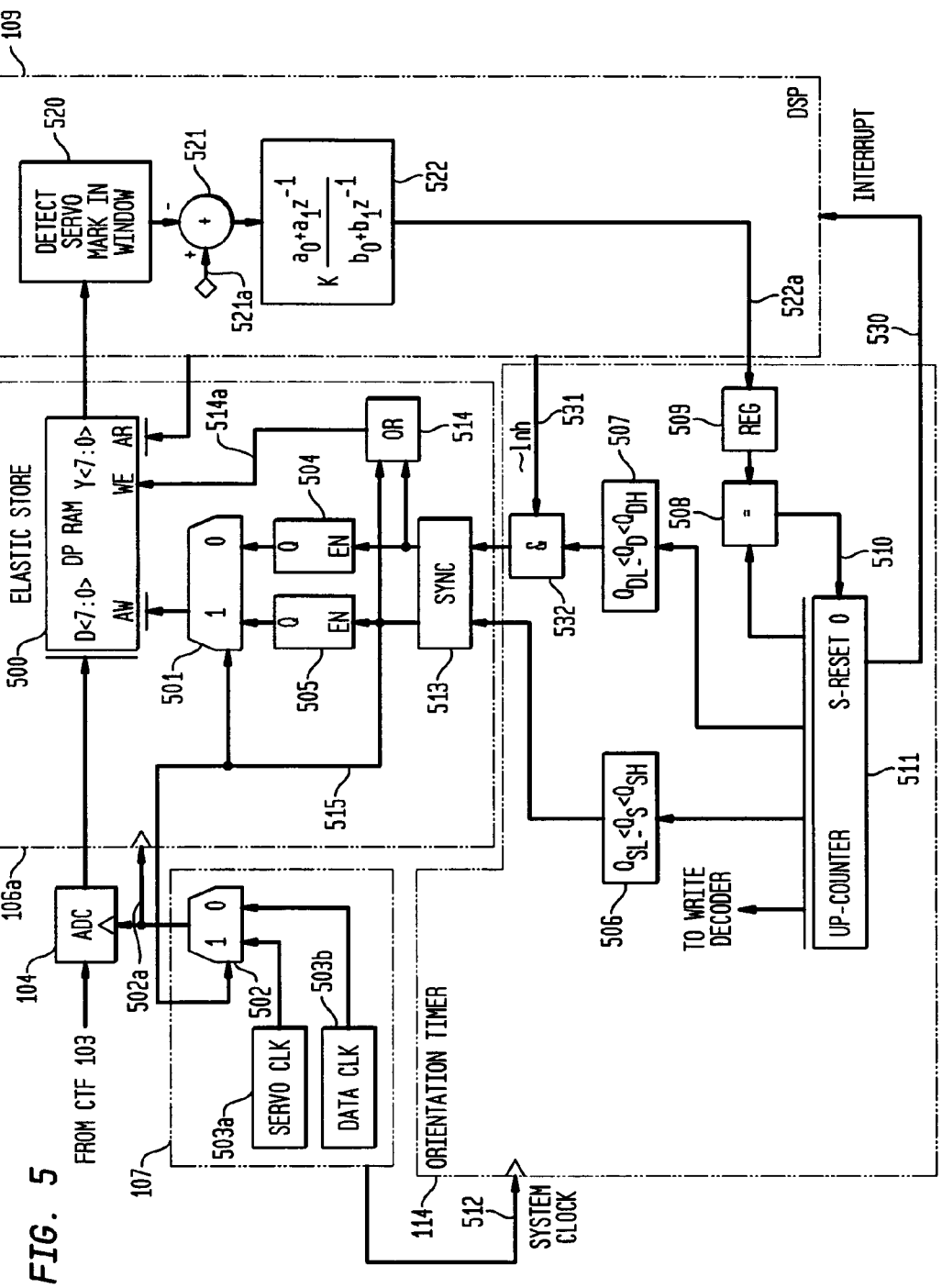
FIG. 5 shows a block diagram of an exemplary phase-locked loop implemented by the disk drive of FIG. 1.
Figure 6:
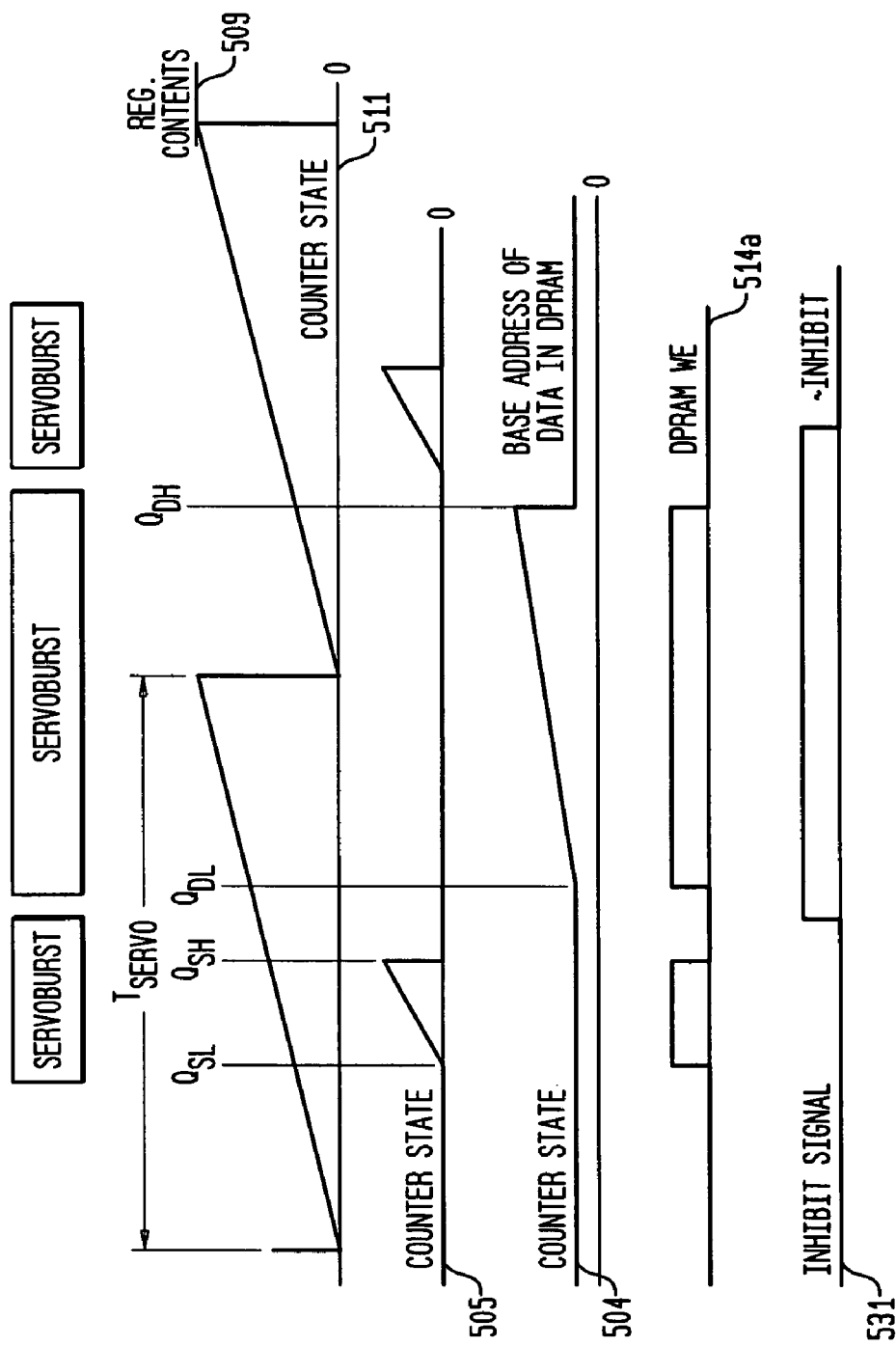
FIG. 6 illustrates timing and waveforms for various elements of FIG. 5.

FIG. 5 shows a block diagram of the digital phase locked loop (PLL) implemented by disk drive 100 that is employed to control sampling of servo burst data and user data records by ADC 104. FIG. 5 shows elements of ADC 104, elastic store buffer 106a, orientation timer 114, and clock 107 of FIG. 1. In addition, FIG. 5 shows routines executed by processor 109 as functional blocks 520, 521, and 522. FIG. 6 illustrates timing and waveforms for various elements of FIG. 5.

Referring to FIG. 5, clock 107, in addition to providing a system clock on lead 512, which system clock rate may typically be in the range 50-100 MHz, also provides a servo clock signal from servo clock 503a and a user data clock signal from user data clock 503b. The servo clock signal provides timing equivalent to timing of servo burst data from medium 101a, and the servo clock signal is generally at a constant frequency lower than the frequency of the data clock. The user data clock signal provides timing equivalent to timing of user data records from medium 101a. The frequency of the user data clock signal varies with zone on medium 101a, and the user data clock signal might be generated by frequency synthesis from a fixed crystal oscillator. Digital timing recovery allows clocks 503a and 503b to be set at predetermined frequencies above the Nyquist rate. Since exact synthesis to symbol timing rate is not necessary, circuit complexity of a given implementation might be reduced. Mux 502 is employed to select either the servo clock signal or the user data clock signal as a local clock signal on lead 502a to clock elastic store buffer 106a. Servo clock 503a provides the servo clock signal and user data clock 503b provides the user data clock signal to mux 502 for use, respectively, in sampling the servo burst data and the user data record. Mux 502 might be implemented as a synchronous sliver-free-changover selector.

Orientation timer 114 comprises up-counter 511, equal comparator 508, register 509, state comparator 506, state comparator 507, and AND gate 532. Elements of orientation timer 114 are clocked by the system clock. Up-counter 511 counts up from zero until equal comparator 508 determines counter 511 has attained a value equal to that loaded (e.g., synchronously) by processor 109 into register 509, whereupon up-counter 511 recycles synchronously back to zero. Thus, processor 109 governs the recycle rate of up-counter 511.

Up-counter 511 also provides an interrupt signal 530 to processor 109 to indicate availability of newly-digitized servo information in RAM 500 of elastic store buffer 106a. Outputs of up-counter 511 are applied write buffer 106b to time write operations.

State comparators 506 and 507 decode groups of consecutive states from up-counter 511 corresponding to, respectively, the states $Q_S$ which elapse during servo burst data and the states $Q_D$ which elapse during user data record times when up-counter 511 is properly synchronized to signals reproduced from the disc. States $Q_{SL}$ and $Q_{SH}$ are the minimum and maximum servo burst data state values, respectively, and states $Q_{DL}$ and $Q_{DH}$ are the minimum and maximum user data record state values, respectively.

Elastic store buffer 106a comprises RAM 500 implemented as a dual-port RAM having separately addressed input (D) and output (Y) ports with associated address inputs AW and AR, respectively. Alternatively, RAM 500 might be implemented as a single-port RAM, with time-sliced read and write phases. Elastic store buffer 106a further comprises synchronizer (sync) block 513, address counters 504 and 505, OR gate 514, and mux 501. Elastic store buffer 106a and ADC 104 are clocked synchronously by the local clock signal received from mux 502.

Reading and sampling of servo information from ADC 104 into raw digital data stored in elastic store buffer 106a occurs as follows. Comparator 506 asserts its output when up-counter 511 completes an up-count cycle, which up-count cycle is generally equivalent to the servo burst data time period. The output of comparator 506 is re-synchronized to system clock 512 and to local clock 502a in sync block 513 to provide an enable signal. The enable signal is applied to the enable terminal of address counter 505. When the enable input of address counter 505 is asserted (i.e., the enable signal is set to a level that enables operation), address counter 505 counts up from zero. In accordance with the asserted state from sync block 513, mux 501 selects as its output the output of address counter 505 as the address to the write address port of RAM 500. RAM 500 is enabled in write mode when the enable signal is asserted (which appears at the output terminal of OR gate 514). Mux 502 selects the servo clock signal when the enable signal is asserted to clock ADC 104 and elastic store buffer 106a at the servo clock rate. Thus, digital samples representing the servo burst data are written into RAM 500 at consecutive locations, commencing, for example, with zero.

Reading and sampling of user data records into raw digital data stored in elastic store buffer 106a occurs by a similar process as that described for reading and sampling of servo burst data. Comparator 507 asserts its output when up-counter 511 completes an up-count cycle, which up-count cycle is generally equivalent to the user data burst time period. Mux 501 selects as its output the output of address counter 504, which points into the region of RAM 500 reserved for digitized data, since the enable signal generated by sync block 513 from comparator 506 is not asserted. Address counter 504 is initialized, when address counter 504 is not counting, to the base address of the data region of RAM 500. The data clock signal of data clock 503b is selected as local clock signal 502a since the enable signal generated by sync block 513 from up-counter 506 is not asserted. The output of comparator 507 is re-synchronized to system clock 512 and to local clock 502a in sync block 513 to provide an enable signal. The enable signal from sync block 513 is provided to OR gate 514 to enable RAM 500 in write mode. Thus, digital samples representing the user data burst are written into RAM 500 at consecutive locations, commencing with a data region base address.

Hardware for reading user burst data differs from that for reading servo burst data by provision of AND gate 532 and of inhibit signal (Inh) 531 from processor 109. Inhibit signal 531 is set so as to suspend transfer of user burst data into the data region of RAM 500. Suspending transfer of user burst data is employed because signal processing (by routines in processor 109) of a single data record might consume multiple servo-burst data periods (as is shown in FIG. 2). A similar inhibit signal is not necessarily provided for reading servo burst data when servo processing routines in processor 109 have a higher priority, and servo demodulation concludes before arrival of the next servo burst data.

Processor 109 accesses RAM 500 to transfer servo and user burst data to processor 109 and to transfer address information to RAM 500. RAM 500 may be memory-mapped to appear as part of processor 109's memory space, thereby allowing the processor's instructions to operate directly on information stored in RAM 500 without need for intermediate data portion transfers.

For the above-described operation, up-counter 511 is preferably aligned, in time, with servo and data playback information delivered from medium 101*a*. To accomplish this timing alignment, processor 109 implements a digital PLL algorithm. Referring to FIG. 5, the algorithm is shown as blocks 520, 521, 521*a*, 522, and 522*a*. At block 520, processor 109 detects a servo address mark (SAM) beginning the servo burst data by a search of read servo burst data within a sample window. The detection result is an indication of the address (in time) in RAM 500 where the SAM was detected. The detection result of block 520 is applied to combiner 521 which generates a difference between the detection result (actual location) and a reference (e.g., the expected location) provided on line 521*a*. The error e between the detection result and the reference is delivered to compensator filter 522, which applies digital loop compensation filtering to the error given in equation (3):

$$K \frac{a_0 + a_1 z^{-1}}{b_0 + b_1 z^{-1}} e \quad (3)$$

where K is a loop filter constant, and $\{a_0, a_1, b_0, b_1\}$ are the compensator filter tap values. The output compensator filter 522 is applied to register 509 via lead 522*a*. The output of register 509 controls the recycle rate of up-counter 511, thus closing the PLL loop. Operation of the PLL forces mean SAM arrival time to be substantially equivalent to the reference present on input 521*b*.

A hardware-assist correlator might be used to detect the SAM. PLL loop update rate is once per servo burst data period/occurrence or a sub-multiple of this period. Loop-tracking stiffness might be reduced if adequate reserve buffer length is furnished in RAM 500. Since interpolated timing recovery is implemented via a digital signal processing routine, loop tracking stiffness does not affect timing recovery.

Initial timing acquisition of up-counter 511 may occur by allowing up-counter 511 to free-run at a higher or lower than the expected servo burst data recurrence rate to slide the sample window through the servo burst data. Once samples of the servo burst data are found, an instantaneous phase correction is made, after which steady-state tracking starts. During initial acquisition of playback data, the gain of DVGA 102 might be set to a series of trial values, or, alternatively, the coarse AGC loop might be modified to regulate the mean absolute data value to prevent saturation of ADC 104. Once acquisition is obtained, control of the coarse AGC loop reverts to the algorithms of FIG. 4.

A recording and/or playback disc drive operating in accordance with one or more embodiments of the present invention may exhibit the following advantages. Since substantial functionality of the disc drive is embodied as steps of signal processing routines of on a dedicated processor, the present invention may allow for low-rate recording and/or playback in systems with a relatively low portion of dedicated hardware, reducing the cost of such systems.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An apparatus comprising:
    a sampling section adapted to sample a signal read from a recording medium based on a local clock signal and a gain signal, the signal being read from the medium based on a control signal;
    a memory adapted to store the sampled signal based on the local clock signal and timing information to i) select a rate of the local clock signal and enable transfer of the sampled signal into and out of the memory;
    an orientation timer adapted to generate the timing information based on a loop timing signal; and
    a software-based processor adapted to generate the control signal so as to process the sampled signal from the memory with one or more routines, wherein the software processor is adapted to implement at least a portion of the processing for:
    1) a data processing routine that processes the sampled signal, and
    2) an automatic gain control (AGC) routine that i) calculates a gain gradient from the sampled signal processed by the data processing routine and ii) generates the gain signal based on a gain gradient;

wherein:
the gain routine is at least partially software-based and comprises a coarse AGC sub-routine and a fine AGC sub-routine;
the coarse AGC sub-routine adjusts a gain of the sampling section based on a coarse gain value and updates the coarse gain value based on the gain gradient;
the fine AGC sub-routine adjusts samples of the sampled signal based on a fine gain value, and updates the fine gain value based on the gain gradient; and
the coarse AGC sub-routine updates the coarse gain value by generating a mean of the gain gradient and integrating the mean to provide the updated coarse gain value.

2. The invention as recited in claim 1, wherein the fine AGC sub-routine updates the fine gain value by integrating the gain gradient to provide the updated fine gain value.

3. The invention as recited in claim 1, wherein each software-based routine has an associated priority for corresponding processing by the routine.

4. The invention as recited in claim 3, wherein the sampled signal represents servo data and user data, and the data processing routine comprises a servo processing routine and a user data processing routine, wherein the servo processing routine has a relatively higher priority than the user data processing routine.

5. The invention as recited in claim 4, wherein the one or more software-based routines further comprises a timing recovery routine, the timing recovery routine i) calculating a timing gradient, ii) maintaining symbol timing based on an interpolation filter defined by a set of tap-values, and iii) updating each tap value of the interpolation filter based on the timing gradient.

6. The invention as recited in claim 4, wherein the user data routine is at least partially software-based and equalizes the sampled signal, detects a symbol sequence from the equalized sampled signal, and decodes the symbol sequence.

7. The invention as recited in claim 1, wherein the sampling section comprises a variable gain amplifier adapted to adjust a gain of the read signal, a channel filter adapted to filter the read signal, and an analog-to-digital converter adapted to sample the read signal to generate the sampled signal.

8. The invention as recited in claim 1, wherein the apparatus further comprises one or more accelerators, each accelerator providing a pre-defined hardware-based operation for one or more corresponding routines.

9. The invention as recited in claim 1, wherein the software processor is adapted to implement at least a portion of the processing for a phase-locked loop routine (PLL) that generates the loop timing signal, and
the PLL routine is at least partially software-based and detects a predefined pattern in the sampled signal, compares a position of the predefined pattern within the sampled signal with a reference to provide an error indication, and filters the error indication to provide the loop timing signal.

10. The invention as recited in claim 1, further comprising a head assembly adapted to read the signal from the recording medium based on the control signal, and wherein the head assembly is further adapted to write data to the recording medium, the one or more routines further comprises a write routine for writing data, and the write routine is at least partially software-based and transfers data from the memory to the head assembly in accordance with the control signal.

11. The invention as recited in claim 9, wherein:
the orientation timer comprises i) a counter adapted to count based on an input value from the processor generated with the PLL routine and ii) a first comparator adapted to compare an output count value of the counter to a first reference to generate a first enable signal; and
the memory comprises a first address counter associated with the first comparator and adapted to count based on the presence of the enable signal, and wherein the memory stores the sampled signal based on the count value of the first address counter when the enable signal is present.

12. The invention as recited in claim 11, wherein the orientation timer comprises a second comparator adapted to compare an output count value of the counter to a second reference to generate a first enable signal, and the memory comprises a second address counter associated with the second comparator and adapted to count based on the presence of the second enable signal, and wherein the memory transfers the sampled signal to the processor based on the count value of the second address counter when the second enable signal is present.

13. The invention as recited in claim 1, wherein the apparatus is embodied in an integrated circuit (IC).

14. The invention as recited in claim 13, wherein the IC is implemented as a component of either a magnetic recording system or an optical recording system.

15. An apparatus comprising:
a sampling section adapted to sample a signal read from a recording medium based on a local clock signal and a gain signal, the signal being read from the medium based on a control signal;
a memory adapted to store the sampled signal based on the local clock signal and timing information to i) select a rate of the local clock signal and enable transfer of the sampled signal into and out of the memory;
an orientation timer adapted to generate the timing information based on a loop timing signal; and
a software-based processor adapted to generate the control signal so as to process the sampled signal from the memory with one or more routines, wherein the software processor is adapted to implement at least a portion of the processing for:
1) a data processing routine that processes the sampled signal, and
2) an automatic gain control (AGC) routine that i) calculates a gain gradient from the sampled signal processed by the data processing routine and ii) generates the gain signal based on a gain gradient;

wherein:
the gain routine is at least partially software-based and comprises a coarse AGC sub-routine and a fine AGC sub-routine;
the coarse AGC sub-routine adjusts a gain of the sampling section based on a coarse gain value and updates the coarse gain value based on the gain gradient;
the fine AGC sub-routine adjusts samples of the sampled signal based on a fine gain value, and updates the fine gain value based on the gain gradient; and
the fine AGC sub-routine updates the fine gain value by integrating the gain gradient to provide the updated fine gain value.

16. The invention as recited in claim 15, wherein each software-based routine has an associated priority for corresponding processing by the routine.

17. The invention as recited in claim 16, wherein the sampled signal represents servo data and user data, and the data processing routine comprises a servo processing routine and a user data processing routine, wherein the servo processing routine has a relatively higher priority than the user data processing routine.

18. The invention as recited in claim 17, wherein the one or more software-based routines further comprises a timing recovery routine, the timing recovery routine i) calculating a timing gradient, ii) maintaining symbol timing based on an interpolation filter defined by a set of tap-values, and iii) updating each tap value of the interpolation filter based on the timing gradient.

19. The invention as recited in claim 17, wherein the user data routine is at least partially software-based and equalizes the sampled signal, detects a symbol sequence from the equalized sampled signal, and decodes the symbol sequence.

20. The invention as recited in claim 15, wherein the sampling section comprises a variable gain amplifier adapted to adjust a gain of the read signal, a channel filter adapted to filter the read signal, and an analog-to-digital converter adapted to sample the read signal to generate the sampled signal.

21. The invention as recited in claim 15, wherein the apparatus further comprises one or more accelerators, each accelerator providing a pre-defined hardware-based operation for one or more corresponding routines.

22. The invention as recited in claim 15, wherein the software processor is adapted to implement at least a portion of the processing for a phase-locked loop routine (PLL) that generates the loop timing signal, and
the PLL routine is at least partially software-based and detects a predefined pattern in the sampled signal, compares a position of the predefined pattern within the sampled signal with a reference to provide an error indication, and filters the error indication to provide the loop timing signal.

23. The invention as recited in claim 15, further comprising a head assembly adapted to read the signal from the recording medium based on the control signal, and wherein the head assembly is further adapted to write data to the recording medium, the one or more routines further comprises a write routine for writing data, and the write routine is at least partially software-based and transfers data from the memory to the head assembly in accordance with the control signal.

24. The invention as recited in claim 22, wherein:
the orientation timer comprises i) a counter adapted to count based on an input value from the processor generated with the PLL routine and ii) a first comparator adapted to compare an output count value of the counter to a first reference to generate a first enable signal; and
the memory comprises a first address counter associated with the first comparator and adapted to count based on the presence of the enable signal, and wherein the memory stores the sampled signal based on the count value of the first address counter when the enable signal is present.

25. The invention as recited in claim 24, wherein the orientation timer comprises a second comparator adapted to compare an output count value of the counter to a second reference to generate a first enable signal, and the memory comprises a second address counter associated with the second comparator and adapted to count based on the presence of the second enable signal, and wherein the memory transfers the sampled signal to the processor based on the count value of the second address counter when the second enable signal is present.

26. The invention as recited in claim 15, wherein the apparatus is embodied in an integrated circuit (IC).

27. The invention as recited in claim 26, wherein the IC is implemented as a component of either a magnetic recording system or an optical recording system.

28. An apparatus comprising:
a sampling section adapted to sample a signal read from a recording medium based on a local clock signal and a gain signal, the signal being read from the medium based on a control signal;
a memory adapted to store the sampled signal based on the local clock signal and timing information to i) select a rate of the local clock signal and enable transfer of the sampled signal into and out of the memory;
an orientation timer adapted to generate the timing information based on a loop timing signal; and
a software-based processor adapted to generate the control signal so as to process the sampled signal from the memory with one or more routines, wherein the software processor is adapted to implement at least a portion of the processing for:
1) a data processing routine that processes the sampled signal, and
2) an automatic gain control (AGC) routine that i) calculates a gain gradient from the sampled signal processed by the data processing routine and ii) generates the gain signal based on a gain gradient;
wherein:
the software processor is adapted to implement at least a portion of the processing for a phase-locked loop routine (PLL) that generates the loop timing signal;
the PLL routine is at least partially software-based and detects a predefined pattern in the sampled signal, compares a position of the predefined pattern within the sampled signal with a reference to provide an error indication, and filters the error indication to provide the loop timing signal;
the orientation timer comprises i) a counter adapted to count based on an input value from the processor generated with the PLL routine and ii) a first comparator adapted to compare an output count value of the counter to a first reference to generate a first enable signal; and
the memory comprises a first address counter associated with the first comparator and adapted to count based on the presence of the enable signal, and wherein the memory stores the sampled signal based on the count value of the first address counter when the enable signal is present.

29. The invention as recited in claim 28, wherein the gain routine is at least partially software-based and comprises a coarse AGC sub-routine and a fine AGC sub-routine, wherein:
the coarse AGC sub-routine adjusts a gain of the sampling section based on a coarse gain value and updates the coarse gain value based on the gain gradient; and
the fine AGC sub-routine adjusts samples of the sampled signal based on a fine gain value, and updates the fine gain value based on the gain gradient.

30. The invention as recited in claim 29, wherein the coarse AGC sub-routine updates the coarse gain value by generating a mean of the gain gradient and integrating the mean to provide the updated coarse gain value.

31. The invention as recited in claim 29, wherein the fine AGC sub-routine updates the fine gain value by integrating the gain gradient to provide the updated fine gain value.

32. The invention as recited in claim 28, wherein each software-based routine has an associated priority for corresponding processing by the routine.

33. The invention as recited in claim 32, wherein the sampled signal represents servo data and user data, and the data processing routine comprises a servo processing routine and a user data processing routine, wherein the servo processing routine has a relatively higher priority than the user data processing routine.

34. The invention as recited in claim 33, wherein the one or more software-based routines further comprises a timing recovery routine, the timing recovery routine i) calculating a timing gradient, ii) maintaining symbol timing based on an interpolation filter defined by a set of tap-values, and iii) updating each tap value of the interpolation filter based on the timing gradient.

35. The invention as recited in claim 33, wherein the user data routine is at least partially software-based and equalizes the sampled signal, detects a symbol sequence from the equalized sampled signal, and decodes the symbol sequence.

36. The invention as recited in claim 28, wherein the sampling section comprises a variable gain amplifier adapted to adjust a gain of the read signal, a channel filter adapted to filter the read signal, and an analog-to-digital converter adapted to sample the read signal to generate the sampled signal.

37. The invention as recited in claim 28, wherein the apparatus further comprises one or more accelerators, each accelerator providing a pre-defined hardware-based operation for one or more corresponding routines.

38. The invention as recited in claim 28, further comprising a head assembly adapted to read the signal from the recording medium based on the control signal, and wherein the head assembly is further adapted to write data to the recording medium, the one or more routines further comprises a write routine for writing data, and the write routine is at least partially software-based and transfers data from the memory to the head assembly in accordance with the control signal.

39. The invention as recited in claim 28, wherein the orientation timer comprises a second comparator adapted to compare an output count value of the counter to a second reference to generate a first enable signal, and the memory comprises a second address counter associated with the second comparator and adapted to count based on the presence of the second enable signal, and wherein the memory transfers the sampled signal to the processor based on the count value of the second address counter when the second enable signal is present.

40. The invention as recited in claim 28, wherein the apparatus is embodied in an integrated circuit (IC).

41. The invention as recited in claim 40, wherein the IC is implemented as a component of either a magnetic recording system or an optical recording system.

* * * * *